United States Patent
Hunter et al.

(10) Patent No.: US 7,579,842 B2
(45) Date of Patent: Aug. 25, 2009

(54) BATTERY MANAGEMENT APPARATUS

(75) Inventors: Phillip Mark Hunter, Christchurch (NZ); Timothy Clarence Johnson, Auckland (NZ); Darren Tze Chang Lim, Sarawak (MY); Adnan Anbuky, Christchurch (NZ)

(73) Assignee: Eaton Power Quality Company, Christchurch (NZ)

( * ) Notice: Subject to any disclaimer, the term of this patent is extended or adjusted under 35 U.S.C. 154(b) by 126 days.

(21) Appl. No.: 10/528,897

(22) PCT Filed: Sep. 24, 2003

(86) PCT No.: PCT/NZ03/00218

§ 371 (c)(1),
(2), (4) Date: Apr. 19, 2006

(87) PCT Pub. No.: WO2004/030177

PCT Pub. Date: Apr. 8, 2004

(65) Prior Publication Data

US 2006/0193095 A1 Aug. 31, 2006

(30) Foreign Application Priority Data

Sep. 26, 2002 (NZ) .................................... 521651

(51) Int. Cl.
*G01N 27/416* (2006.01)
(52) U.S. Cl. .................. 324/426; 320/103; 320/116; 320/124; 320/134; 320/136
(58) Field of Classification Search ................ 320/103, 320/116, 104, 124, 134, 136; 324/434, 426, 324/433
See application file for complete search history.

(56) References Cited

U.S. PATENT DOCUMENTS

| 4,709,202 | A | * | 11/1987 | Koenck et al. ............. 320/112 |
| 5,214,385 | A | | 5/1993 | Gabriel et al. |
| 5,498,950 | A | | 3/1996 | Ouwerkerk |
| 5,508,599 | A | * | 4/1996 | Koenck ..................... 320/138 |
| 5,631,503 | A | * | 5/1997 | Cioffi ......................... 307/66 |
| 5,656,915 | A | | 8/1997 | Eaves |

(Continued)

FOREIGN PATENT DOCUMENTS

WO          WO 99/01918          1/1999

(Continued)

*Primary Examiner*—Akm E Ullah
*Assistant Examiner*—Arun Williams
(74) *Attorney, Agent, or Firm*—Myers Bigel Sibley & Sajovec, P.A.

(57) ABSTRACT

A battery management system includes a sensing module, a feeding module, a control module, and a common line adapted for connection to a battery when in use. In some embodiments, a battery management apparatus for managing a substring of cells in a string of cells includes a DC bus, a multiplexer/demultiplexer circuit operative to selectively couple nodes of the substring of cells to the DC bus, a DC/DC converter circuit having a first port configured to be coupled across a plurality of cells of the string and a second port coupled to the DC bus, the DC/DC converter operative to transfer energy between the first and second ports, a sensor circuit coupled to the DC bus, and a controller circuit configured to connect to a communications bus and operatively associated with the multiplexer/demultiplexer circuit, the DC/DC converter and the sensor circuit.

27 Claims, 15 Drawing Sheets

U.S. PATENT DOCUMENTS

| | | | | |
|---|---|---|---|---|
| 5,670,861 | A * | 9/1997 | Nor | 320/118 |
| 5,821,729 | A * | 10/1998 | Schmidt et al. | 320/126 |
| 5,939,861 | A * | 8/1999 | Joko et al. | 320/122 |
| 6,150,795 | A | 11/2000 | Kutkut et al. | |
| 6,181,100 | B1 * | 1/2001 | Shoji | 320/103 |
| 6,262,494 | B1 * | 7/2001 | Tsukuni et al. | 307/80 |
| 6,274,950 | B1 | 8/2001 | Gottlieb et al. | |
| 6,373,226 | B1 | 4/2002 | Itou et al. | |
| 6,424,119 | B1 | 7/2002 | Nelson et al. | |
| 6,559,621 | B2 * | 5/2003 | Corless et al. | 320/103 |
| 6,677,725 | B2 * | 1/2004 | Tamai et al. | 320/103 |
| 2001/0052758 | A1 * | 12/2001 | Odaohhara | 320/103 |

FOREIGN PATENT DOCUMENTS

| WO | WO 01/82260 | 11/2001 |
|---|---|---|

\* cited by examiner

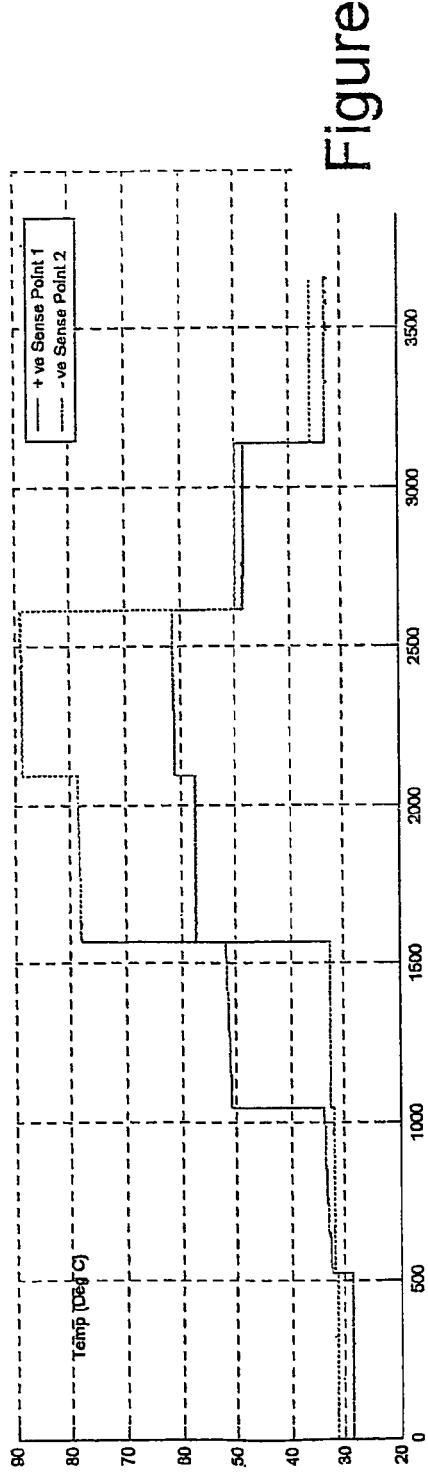
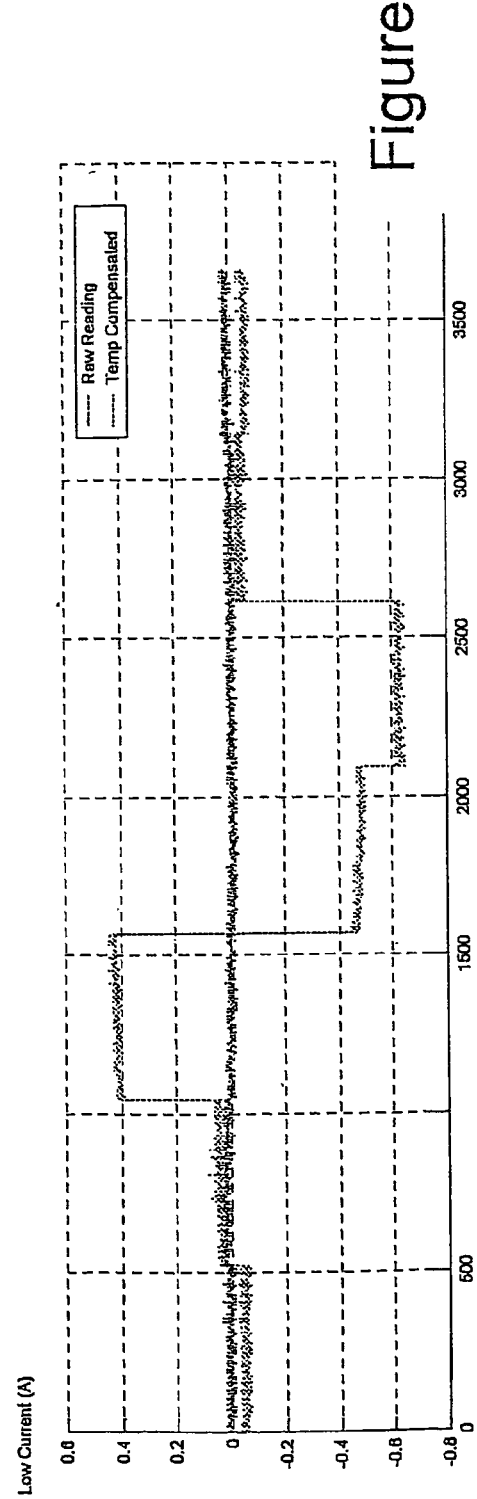
Figure 10 (a)
Figure 10 (b)

BATTERY MANAGEMENT APPARATUS

RELATED APPLICATIONS

The present application is a 35 U.S.C. §371 national phase application of PCT International Application No. PCT/NZ2003/000218, having an international filing date of Sep. 24, 2003, and claiming priority to New Zealand Patent Application No. 521651, filed Sep. 26, 2002, the disclosure of which are incorporated herein by reference in their entireties. The above PCT International Application was published in the English language and has International Publication No. WO 2004/030177 A1.

BACKGROUND OF THE INVENTION

The present invention relates to battery management, and more particularly, to apparatus for managing batteries in a serially connected string.

On-line battery monitoring is becoming acceptable common practice within telecommunication power systems applications. A number of commercial products are currently available for such purposes. See, for example, E Gotaas & A Nettum; "Single Cell Battery Management Systems (BMS)"; Intelec 2000; Sep. 10-14 2000; Phoenix; USA; Paper 36.2; or A Anbuky, P Pascoe & P Hunter; "Knowledge Based VRLA Battery Monitoring & Health Assessment"; Intelec 2000; Sep. 10-14 2000; Phoenix; USA; Paper 36.1.

Known commercial products can provide advantages over conventional intermittent or offline monitoring. The approach to monitoring often is either based on centralised sensing and intelligence (see for example S Deshpando et al; "Intelligent Monitoring System Satisfies Customer Needs for Continuous Monitoring and Assurance on VRLA Batteries"; INTELEC, 1999) or distributed sensing and centralised intelligence organisation. Many of these products deal with a low level of information processing (e.g. smoothing and limit violation detection) while leaving the intelligent part to a human expert.

With the advancement of microelectronic technology, local sensing and intelligence is becoming feasible, allowing for distributed sensing and intelligence organisation. One further aspect that may require attention for low-energy batteries is the power required by the sensor to operate. Sensors are normally parasitic on the battery. Energy consumption can become noticeable when dealing with low ampere-hour batteries.

Goals for an advanced battery management system include: a) presenting timely information on battery reserved time upon mains failure; b) presenting timely information on battery remaining life; and c) maintaining safe battery operation (i.e., preserving battery life). These goals may be partially met by a central management unit or left to a human expert. The goal of life preservation generally involves charge management and control. An appropriate hardware device for interaction among a group of cells to facilitate individual cell current feeding and draining is desirable. An optimal solution preferably would determine the internal status of each cell and provide a facility to individually optimise each cell's float charge.

There may be a trade-off between cost and the functionality that is provided by additional electronics. An application specific integrated circuit (ASIC) solution presented by Scott (N Scott; "A single Integrated Circuit Approach to Real Capacity Estimation and Life Management of VRLA Batteries"; Intelec'01; Edinburgh International Conference Centre (EICC) UK; 14-18 Oct. 2001) may satisfy some of the above-described requirements. However, an optimal ASIC design may swing this equation in favour of functionality. A further known system is described in A Anbuky, Z Ma & S Sanders; "Distributed VRLA Battery Management Organisation with Provision for Embedded Internet Interface"; Intelec 2000; Sep. 10-14 2000; Phoenix; USA; Paper 37.2.

SUMMARY OF THE INVENTION

A first aspect of the invention provides a battery management system including a sensing module; a feeding module; a control module coupled to the sensing module and the feeding module; and a common line coupled to both the sensing module and the feeding module and adapted for connection to a battery when in use, wherein the sensing module is configured to receive battery information from the common line and output a sensing signal to the control module in accordance with the battery information, wherein the control module is configured to receive the sensing signal from the sensing module and output a control signal in accordance with the battery information, and wherein the feeding module is configured to feed and/or drain a battery connected to the common line when in use in accordance with the control signal.

The first aspect of the invention recognises the fact that both sensing functions, and control functions (for example feed or drain of current for equalisation purposes) can both be performed via a common line. This minimises the number of parts required and lends itself to an embedded solution—that is, the sensing, feeding and control modules can be enclosed in a battery compartment.

The system may have only one common line, but in general a number of common lines will be provided. Typically at least two common lines are provided, each coupled to a respective end of a battery.

A second aspect of the invention provides a battery management system including a sensing module; a feeding module; and a control module coupled to the sensing module and the feeding module; wherein the sensing module is configured to receive battery information and output a sensing signal to the control module in accordance with the battery information, wherein the control module is configured to receive the sensing signal from the sensing module and output a control signal in accordance with the battery information, wherein the feeding module is configured to feed and/or drain a battery connected to the feeding module when in use in accordance with the control signal in order to perform equalisation of a string of serially connected batteries, and wherein the control module is configured to perform one or more additional battery monitoring or management tasks.

The second aspect of the invention provides a generic system capable of performing battery equalisation and also one or more other monitoring or management tasks. Examples include (but are not limited to) impedance testing or capacity testing.

According to further aspects of the invention, a battery management apparatus for managing a substring of cells in a string of cells includes a DC bus, a multiplexer/demultiplexer circuit operative to selectively couple nodes of the substring of cells to the DC bus, a DC/DC converter circuit having a first port configured to be coupled across a plurality of cells of the string and a second port coupled to the DC bus, the DC/DC converter operative to transfer energy between the first and second ports, and a sensor circuit coupled to the DC bus. A controller circuit is configured to connect to a communications bus and operatively associated with the multiplexer/demultiplexer circuit, the DC/DC converter and the sensor circuit. The apparatus may further include a ground bus, and the multiplexer/demultiplexer circuit may be operative to selectively connect the nodes to the DC bus and the ground bus, and wherein the second port of the DC/DC converter circuit is coupled to the DC bus and the ground bus. The first and second ports of the DC/DC converter circuit may be isolated from one another.

In some embodiments, the DC/DC converter circuit further comprises a third port and is operative to transfer energy between the first and third ports. At least one of the controller circuit, the multiplexer/demultiplexer circuit and the sensor circuit are configured to be powered from the third port. The DC/DC converter circuit may further comprise a fourth port configured to be coupled to a power supply bus associated with the communications bus and may be operative to transfer energy between the fourth port and the third port to power to at least one of the controller circuit, the multiplexer/demultiplexer circuit and the sensor circuit.

In further embodiments, the controller circuit is operative to cause the multiplexer/demultiplexer circuit to couple the DC bus and the ground bus to respective selected first and second nodes of the substring of cells, to cause the sensor circuit to sense a voltage between the DC bus and the ground bus and to cause the DC/DC converter circuit to transfer energy between the selected first and second nodes and the plurality of cells of the strings responsive to the sensed voltage. The controller circuit may be operative to adjust the cells of the string by causing the multiplexer/demultiplexer circuit and the DC/DC converter circuit to transfer energy between at least one cell of the substring and the plurality of cells. The controller circuit may be operative to cause the multiplexer/demultiplexer circuit to couple the DC bus and the ground bus to respective selected first and second nodes of the substring of cells, to cause the DC/DC converter circuit to transfer energy between the selected first and second nodes and the plurality of cells of the strings responsive to the sensed voltage, and to cause the sensor circuit to sense a voltage between the DC bus and the ground bus and/or a current at the DC bus responsive to the transfer of energy. The controller circuit may be further operative to determine a status of at least one cell of the substring responsive to the sensed voltage and/or current and/or may be operative to transmit battery information over the communications bus responsive to the sensed voltage.

According to additional aspects of the invention, the controller circuit is operative to cause the multiplexer/demultiplexer circuit and the DC/DC converter circuit to load at least one cell of the substring while causing the sensor circuit to generate test data for the loaded at least one cell. The controller circuit may process the generated test data to determine a status of the at least one cell, e.g., to generate at least one of an estimate of capacity and an estimate of reserve life from the generated test data. The at least one of an estimate of capacity and an estimate of reserve life may be transmitted over the communications bus.

BRIEF DESCRIPTION OF THE DRAWINGS

FIG. 8($b$) is a graph showing exemplary equalisation of Gates 25AH Cyclon cells with a low feed according to some embodiments of the invention.

FIG. 9($b$) is a graph showing exemplary equalisation of Hawker 2HI275 cells with a high feed according to some embodiments of the invention.

FIG. 10($a$) is a graph showing exemplary shunt temperature performance at low current according to some embodiments of the invention.

FIG. 10($b$) is a graph showing shunt current performance at low current according to some embodiments of the invention.

DETAILED DESCRIPTION

Figure 1:
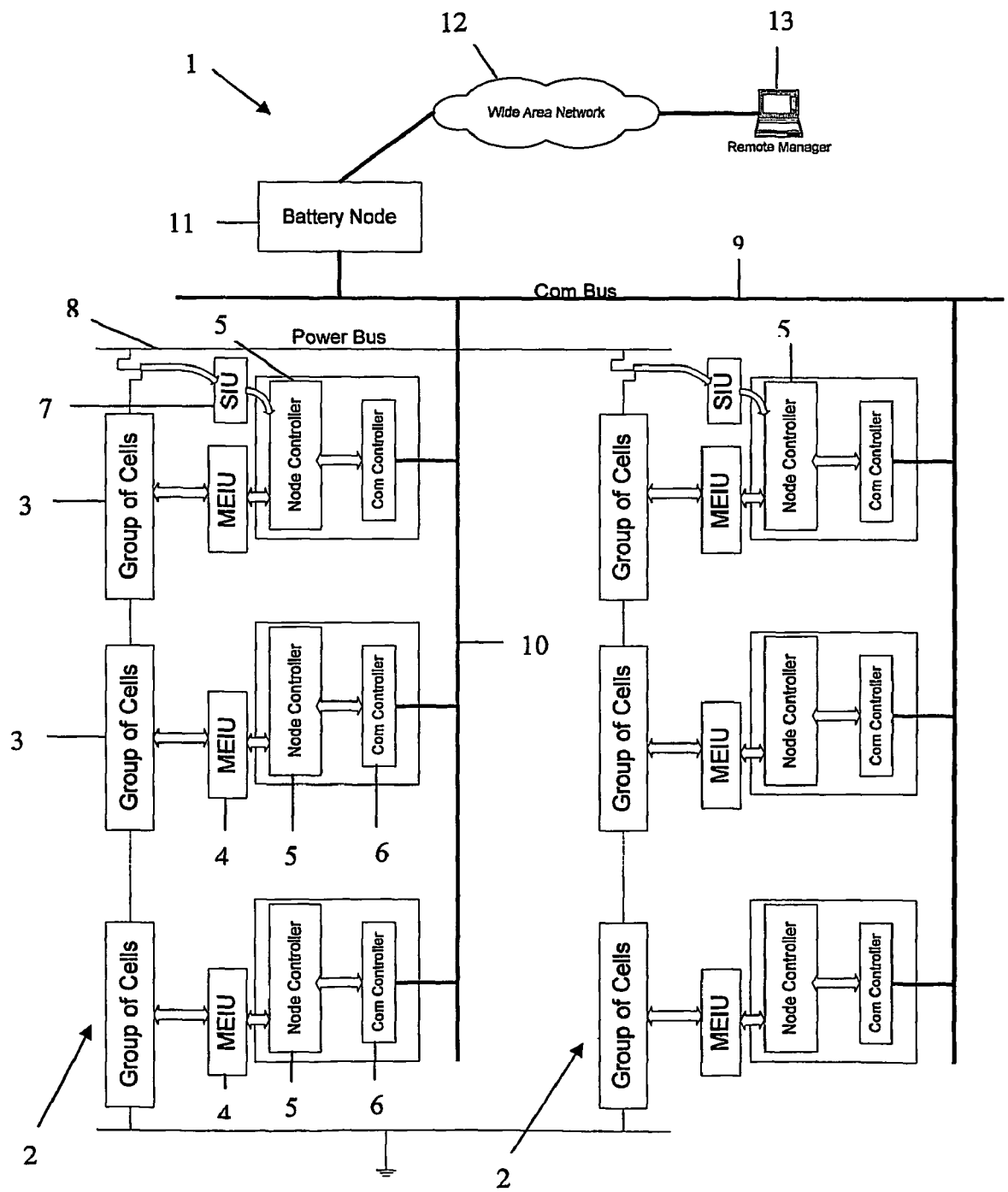
FIG. 1 is a schematic diagram of a battery network management system according to some embodiments of the invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present.

Battery charge management preferably involves sensing and feeding in addition to monitoring activities. The most effective region for life preservation in standby applications would generally be the float region. Both electrode voltage polarisation and cell equalisation are preferably managed to be effective in reducing the stress on the battery cells. Monitoring the cell full charge status and providing an ability to feed a low cell would be a desirable component of the charge management role. In addition, it may be desirable to float current sensing as additional backup to the management activities.

System Organisation

A battery management system 1 according to some embodiments of the invention is organised in the manner shown by FIG. 1. The system includes a number of nodes. Each node looks after a group of cells 3 and is managed by a single node controller 5. Each node also includes a Monitor and Equalise Interface Unit (MEIU) 4. One of the nodes (at the top of a string 2) also includes a Shunt Interface Unit (SIU) 7. A node including an SIU is referred to below as a "string node" and the other nodes are referred to below as "group nodes". The node controller 5 allows for interfacing to one or both of these interface units. This arrangement facilitates a generic controller with provision for variance at the interface level.

Each string of cells 2 is connected in parallel to a power bus 8. The nodes are connected to a battery node 11 via a controller area network (CAN) bus 9,10. The battery node 11 has two basic roles. A first role is to perform battery level management. A second role is to act as a gateway to a remote manager 13 via a WAN 12.

Node Architecture

Figure 2:
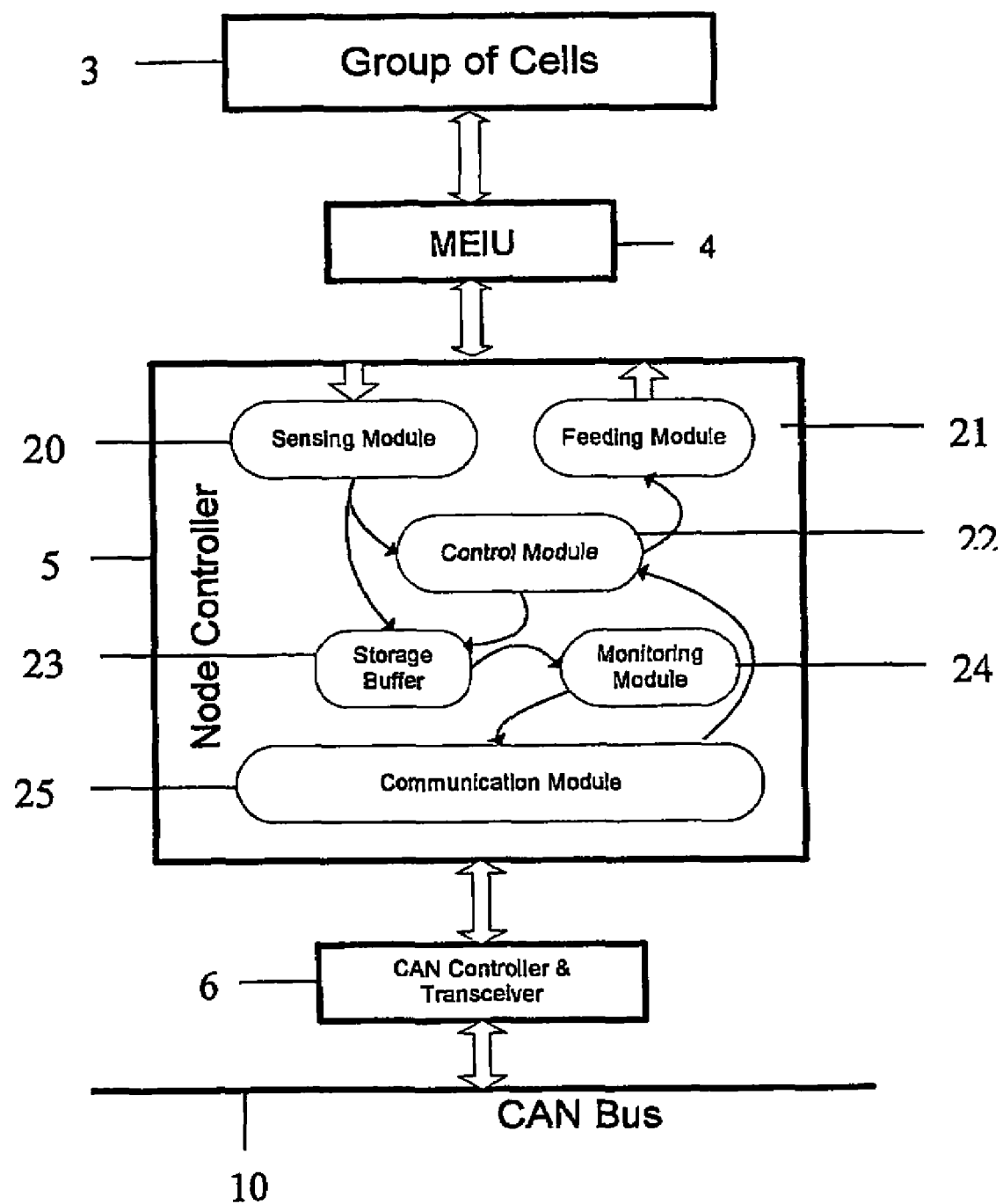
FIG. 2 is a schematic diagram showing the architecture of a node controller according to further embodiments of the invention.

The node design, as shown in FIG. 2, is based on three main components. These are:
Node Controller 5
Node Interface 4
CAN Controller and Transceiver 6

The node controller 5 hosts software for driving the communication controller 6 and node interface 4—that is, it hosts a sensing module 20, feeding module 21 and communication module 25. The node controller 5 also hosts the knowledge modules relevant to signal processing, monitoring and control—that is, it hosts a control module 22, storage buffer 23 and monitoring module 24. The Node Interface 4 is a plug-in unit that provides the essential hardware for the specific functionality. Here two types of interface unit will be demonstrated; the monitor and equalise interface unit (MEIU) 4 and the shunt interface unit (SIU) 7. The communication controller 6 provides the hardware and protocol software for facilitating standard communication among the acting nodes. The arrangement facilitates generic node hardware with a flexibility of introducing variance for the node interface or node monitoring, control and communication software.

Each battery string 2 is partitioned into a number of six-cell groups 3. Other arrangements could also be used. However, this size of cell grouping has been selected for the following reasons: (1) it can provide a sufficient number of cells for inter-cell comparison; and (2) it can correspond to all, half and a quarter of 12V, 24V and 48V strings, respectively. The last two are commonly used for telecommunication applications. As a 12V mono-bloc is a typical six-cell unit, some embodiments of the invention can provide a potential battery-embedded solution. The node controller software contains components that handle the monitoring, control and communication activities. These components could be upgraded or replaced when a new version or release is in place.

Node Interface Unit

Two types of interface units are described herein. These include: a) the monitor and equalise interface unit (MEIU) 4; and b) the shunt interface unit (SIU) 7. The MEIU 4 facilitates cell data acquisition for the group that is being monitored. Cell voltages and group temperature are available here. It also facilitates energy routing from the group into the low cell when dealing with group equalisation. The unit operates through using a pair of sense lines 42,43 to feed a cell at a low rate. The rate of equalise is influenced by the size of battery and may be managed through the micro-controllers embedded PWM control.

Figure 3:
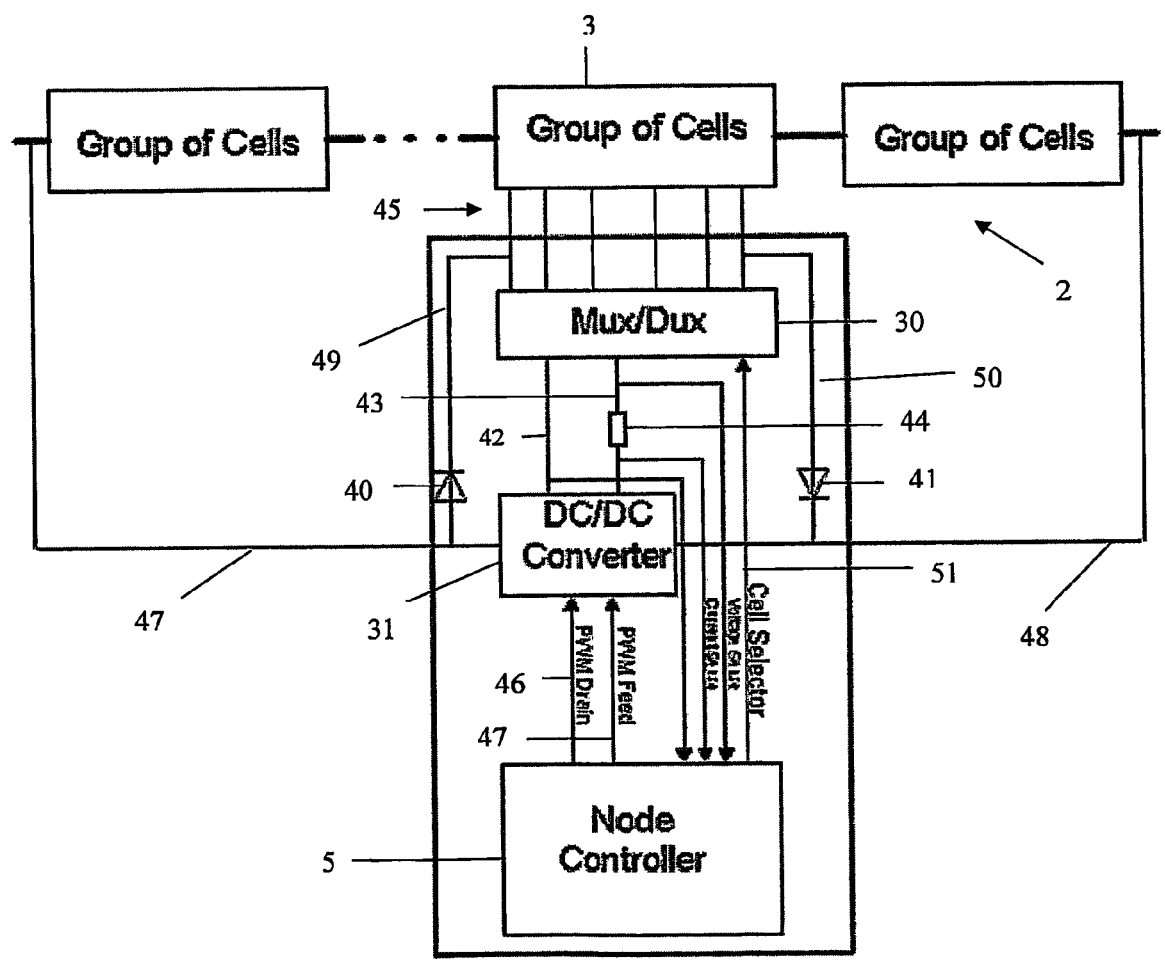
FIG. 3 is a schematic diagram showing a monitor and equalise interface unit (MEIU) according to some embodiments of the invention.

FIG. 3 shows an exemplary configuration of the MEIU. A DC-DC converter 31 converts DC power at a group (or bus) voltage level into a cell voltage level. The converter 31 is connected to a pair of bus voltage lines 47,48. This facilitates feeding from a string of cells 2 into a low cell. The converter 31 is also connected to a pair of group voltage lines 49,50 via diodes 40,41. This facilitates feeding from a group 3 into a low cell. Feeding in the reverse direction is also possible when dealing with a high cell. The average feeding current could be made suitable for the targeted electronics and wiring. A given minimum however should be maintained that is relevant to the battery to be dealt with. Feeding of more than 100 mA could be considered reasonable for a good range of battery capacities.

The second sub-unit within the MEIU is a multiplexing unit 30. This sub-unit has two basic modes of operation. These are a) sense mode and b) feed/drain mode. The sense mode selects a cell that is addressed by a cell selector 51 and connects a pair of output sense/feed lines 45 (each sense/feed line 45 being connected to one electrode of the selected cell) and connects them to a pair of input sense/feed lines 42,43. Input sense/feed line 43 includes a shunt resistor 44. When in sense mode, a pair of voltage sense lines (not labelled) and a current sense line (not labelled) are each connected to an analogue-to-digital converter (not shown) in the node controller 5 for voltage and current measurement. The feed/drain mode connects the selected cell to the DC-DC converter 31. The rate of feed is controlled by a PWM signal on PWM feed line 47 and the rate of drain is controlled by a PWM signal on PWM drain line 46. When in feed/drain mode, current and/or voltage measurements may continue to be made on the selected cell via the current/voltage sense lines.

Figure 4:
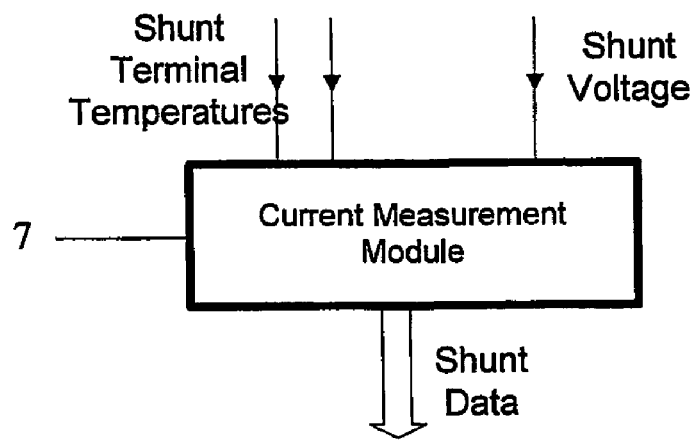
FIG. 4 is a schematic diagram of a shunt interface unit (SIU) according to some embodiments of the invention.

The node interface unit could also be utilised for feeding special perturbations for testing the cell's charge status (i.e. fully charged or not). This would benefit from interpreting the cell behaviour around full charge. This is an important feature in managing the battery at float. It would also facilitate testing of the cell health condition without the need for an external load. According to some embodiments of the invention, equalisation software in the node controller 5 may activate a periodic voltage scan for all cells in the group, identify a lowest cell that requires equalisation and activate the feed until the cell is no longer the lowest among the group. The shunt interface unit (SIU) 7 senses the string current, as shown in FIG. 4. It acquires both the voltage and the differential temperature across the shunt terminal. The SIU 7 works out the string current. According to some embodiments of the invention, the SIU can monitor a wide range of battery current, including float current.

Communication

Figure 5:
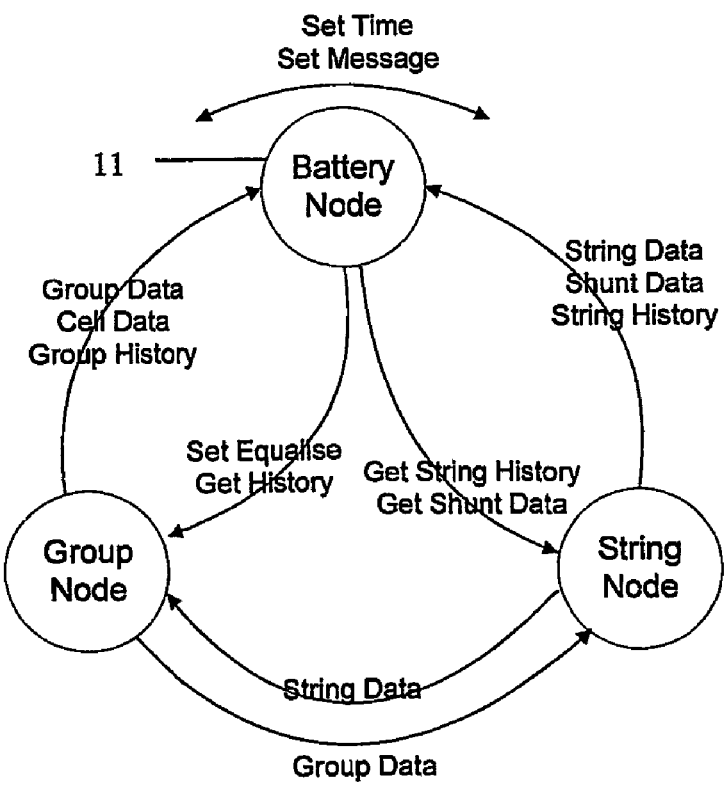
FIG. 5 is a schematic diagram illustrating a communication model for the system of FIG. 1.

The system architecture is based on three logical nodes shown in FIG. 5. These are the group node, the string node and the battery node 11. The group-node looks after a sub-string group 3, utilising a monitor and equalise interface unit (MEIU). The string node looks after a top sub-string group as well as a string 2. This node is physically the same as the group node with the addition of the SIU. The battery node 11 is the network gateway. It provides the access to each of the string or group nodes. It also provides longer term buffering to network information and data. The battery node 11 also provides a time reference to all network nodes. Enabling or disabling of each of the messages within the system could also be accessed through the battery node 11.

In the illustrated embodiments, the node communication is based on a CAN bus 9,10. The battery node 11 acts as a gateway to the site and allows remote management. This node communicates with the battery local network using a CAN controller. It also communicates with a management wide area network 12 using the TCP/IP protocol over an Ethernet bus. The message structure has been organised to cater for key monitoring and control activities within the group relevant to both data and information messages. The message format can be catered for personalising the string allowing for group information to be visible by the associated string nodes and the battery node only.

The strategy for communication is to communicate commands, status and data. The battery node 11 has the authority to enable or disable the individual messages within the group or the string nodes as shown in FIG. 5. The group node 11 performs all monitoring and control locally. The relevant data is buffered and time stamped when significant changes take place. These changes are sent to the string and battery nodes as the changes take place or as requested. The group and string nodes also have the ability to send the short-term history to the battery node 11 when the associated buffer is full or upon request.

Exemplary Node Applications

1. Cell Equalisation

A software module for equalising a group of cells has been implemented. The software senses the voltage of each cell within the group, selects the lowest cell, and boosts it until it reaches the average cell voltage. The process is repeated until all cells are equalised. FIGS. 6 to 9 show different test cases for group equalisation.

Figure 6:
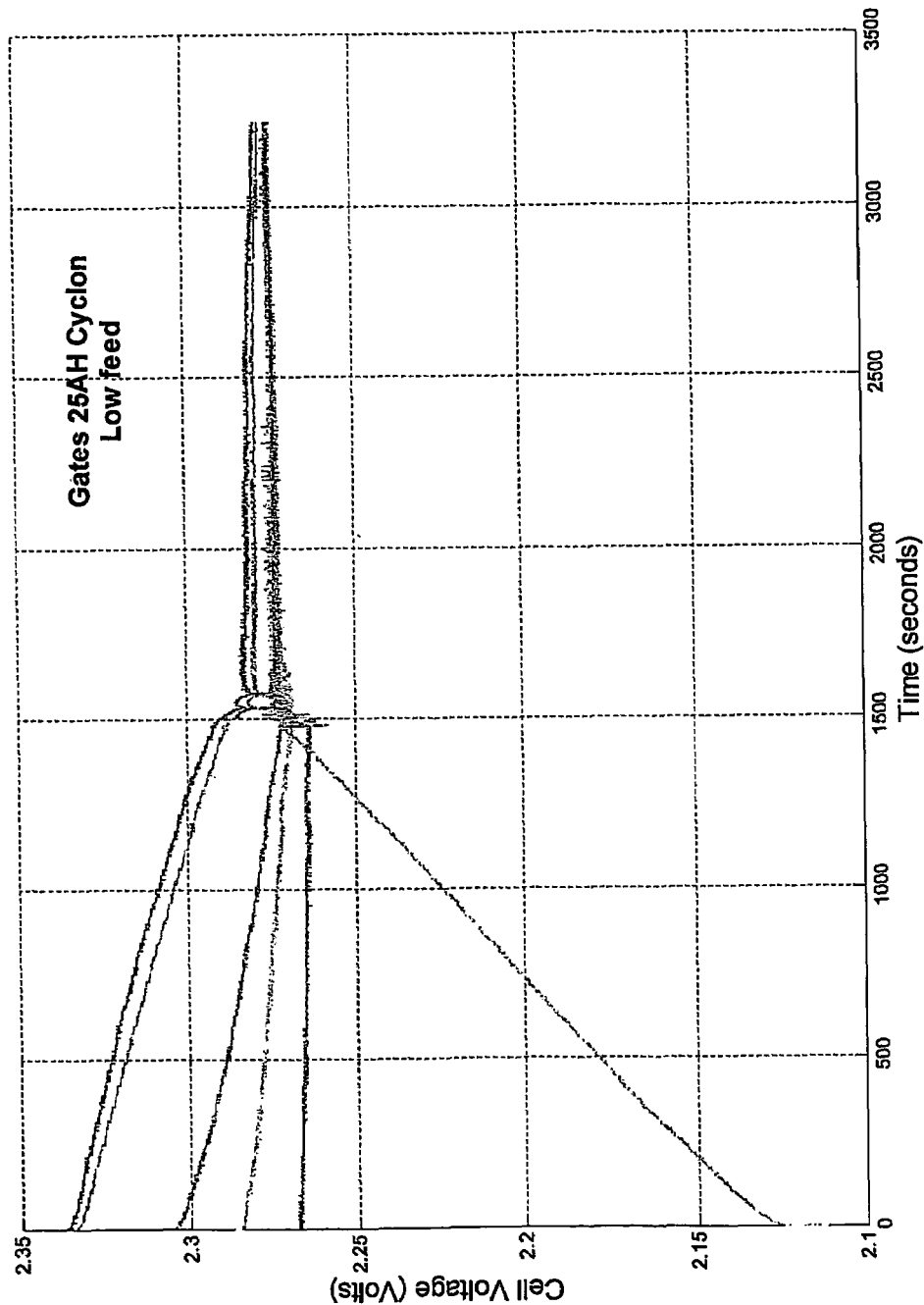
FIG. 6 is a graph showing exemplary operations for equalisation of a discharged cell according to some embodiments of the invention.

The case presented in FIG. 6 shows that the node pulled the low cell up to within the group and then worked on the group to equalise them. Pulling the cell up took about 20 minutes. This is due to the amount of charge that the cell required as it was partially discharged. A cell voltage of around 2.13V indicates this. The group has eventually merged together around 2.27V.

Figure 7:
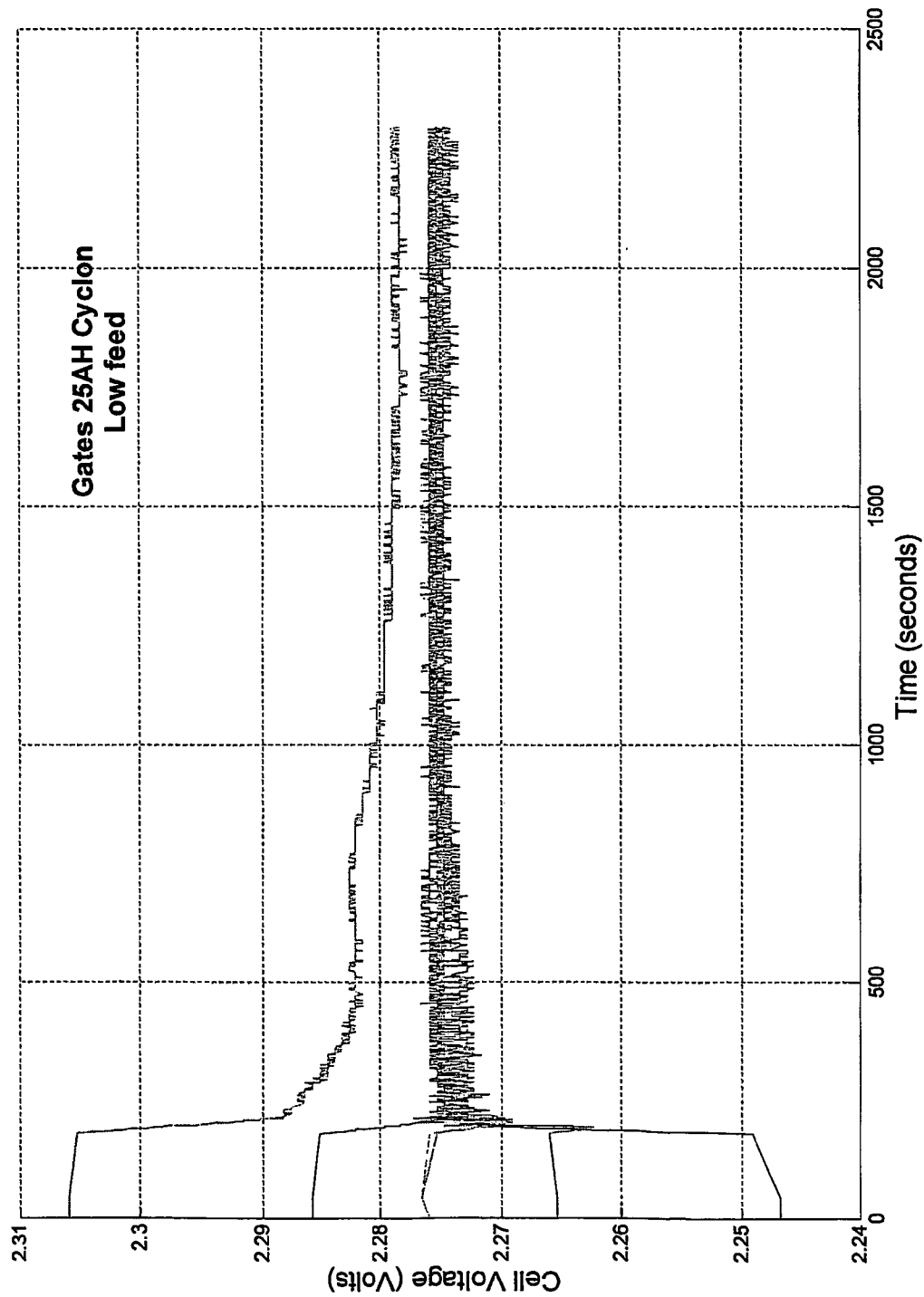
FIG. 7 is a graph showing exemplary equalisation of cells on float according to further embodiments of the invention.
Figure 8:
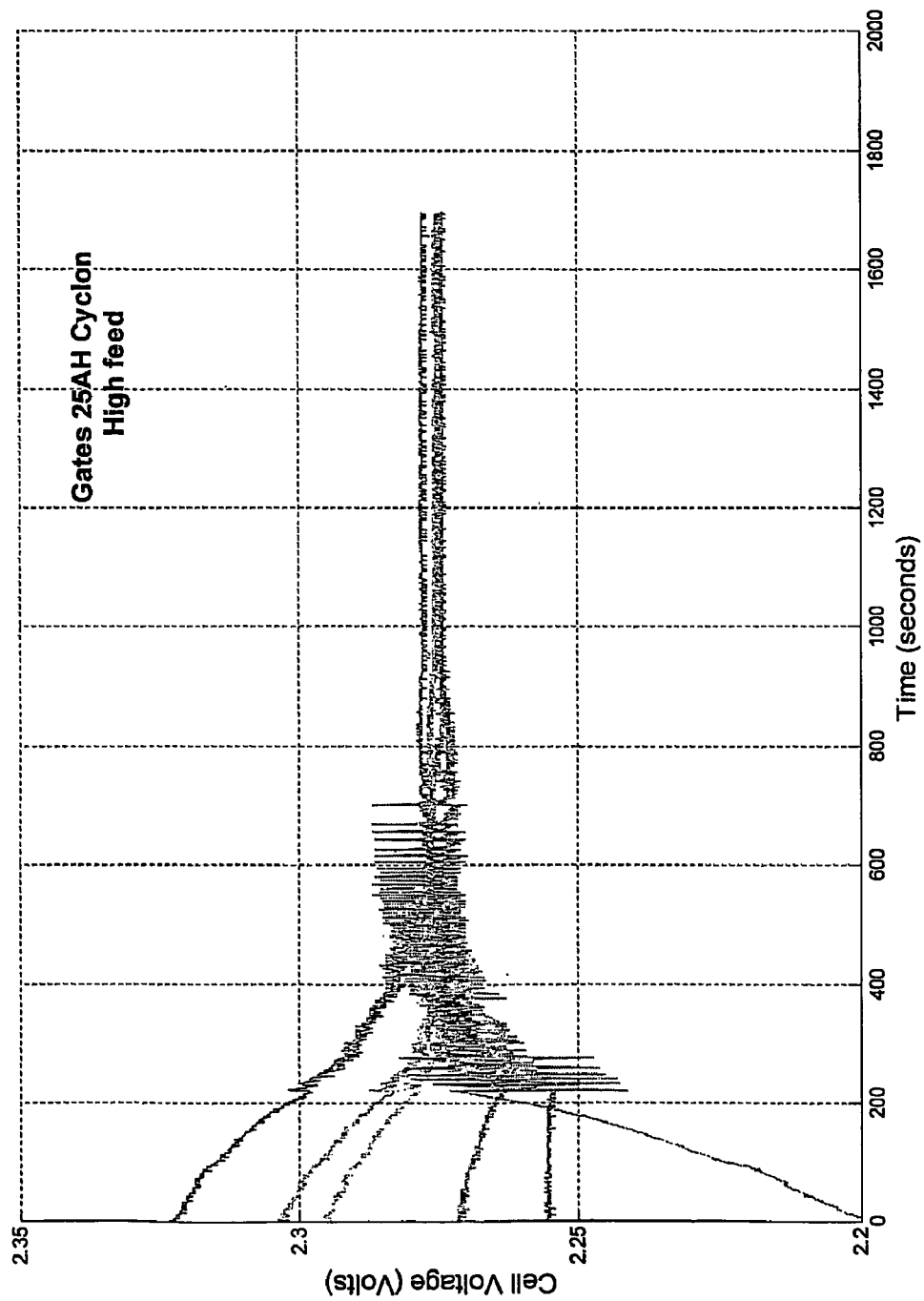
FIG. 8($a$) is a graph showing exemplary equalisation of Gates 25AH Cyclon cells with a high feed according to some embodiments of the invention.
Figure 8:
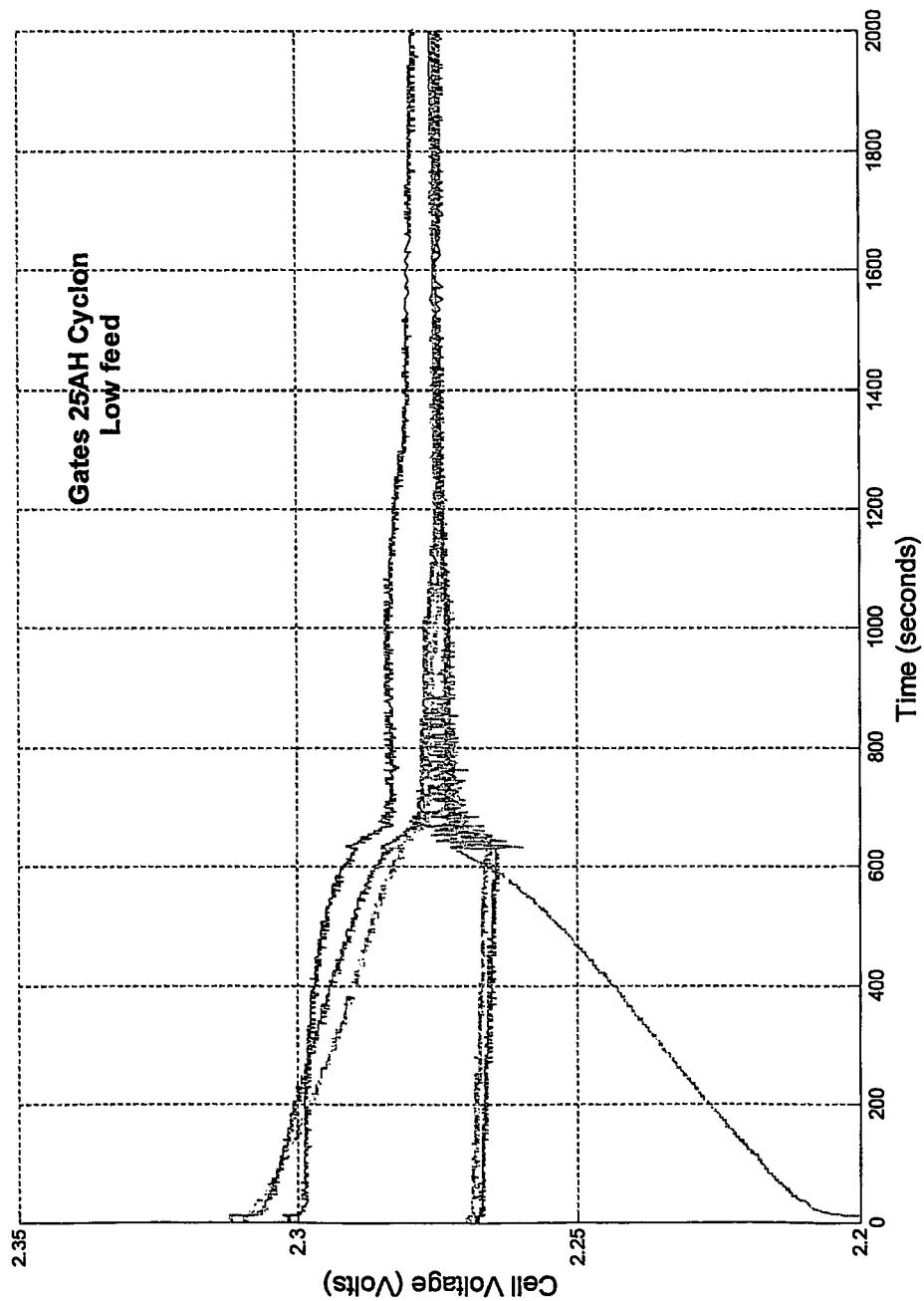

FIG. 7 shows a group of cells that are on float charge but are not equalised. The equalisation process took approximately one minute. Most of the float management of standby batteries will follow the case presented by FIG. 7. Here, the equalisation process is assumed to be active all the time.

FIGS. 8(a) and 8(b) show the influence of changing the feed rate. The recovery of the cell in FIG. 8(a) is appreciably faster than that of FIG. 8(b). This is due to the feed being significantly greater in the case of FIG. 8(a).

Figure 9:
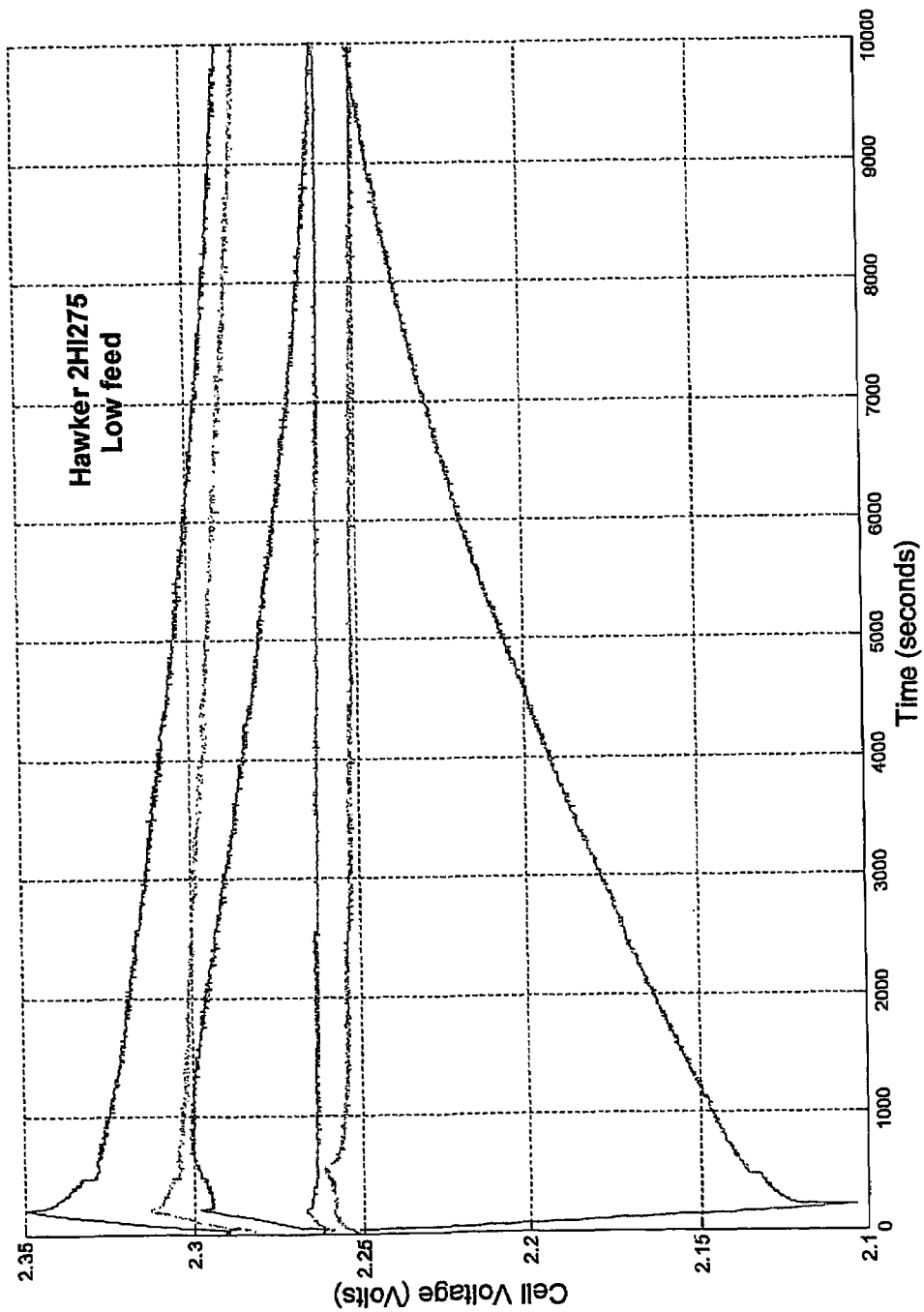
FIG. 9($a$) is a graph showing exemplary equalisation of Hawker 2HI275 cells with a low feed according to some embodiments of the invention.
Figure 9B:
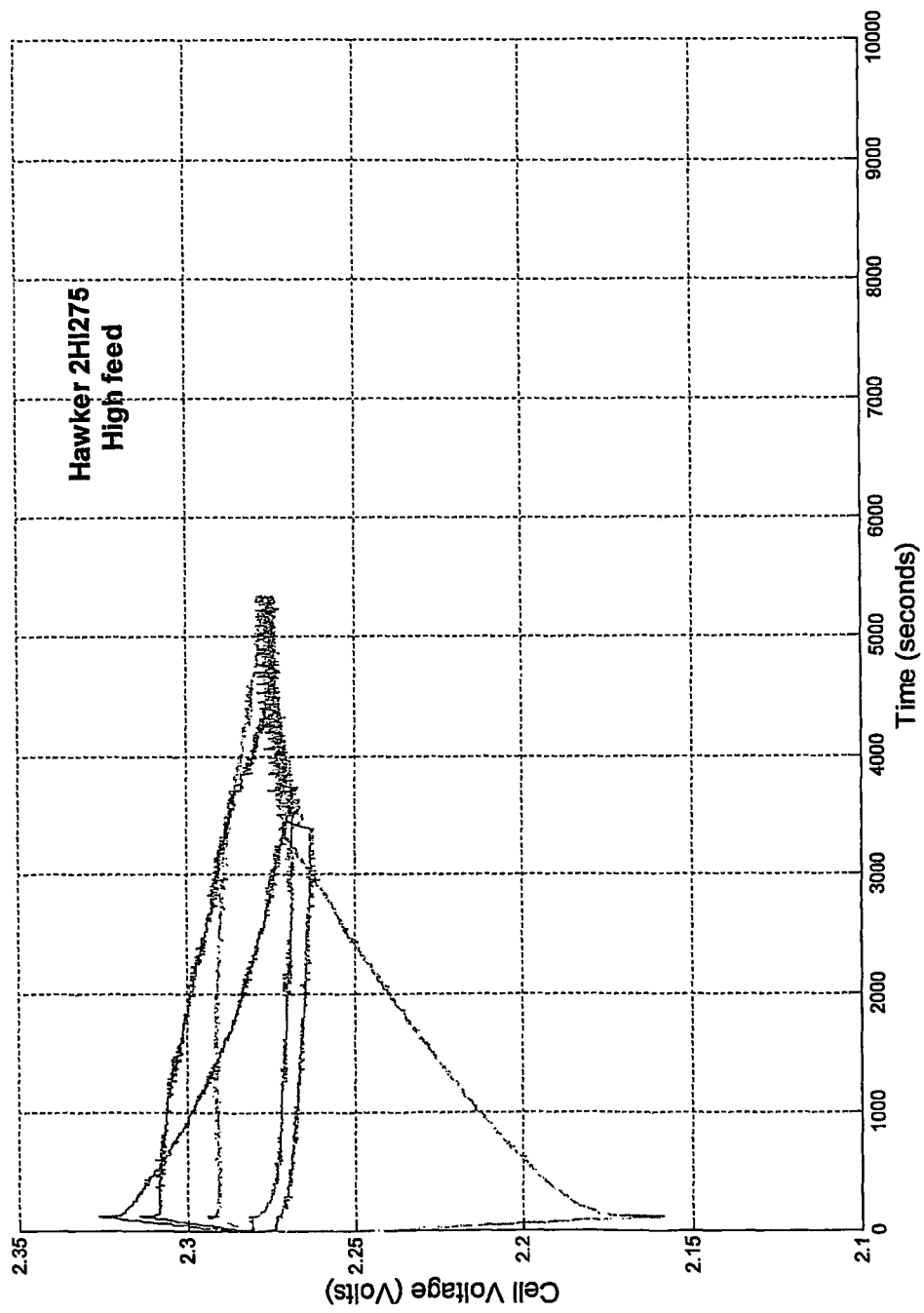

FIGS. 9(a) and 9(b) demonstrate equalisation of six Hawker 2HI275 cells. One cell has been discharged for two minutes at a 10 A rate. FIG. 9(a) shows the cell recovery that has taken place after approximately 3 hours of implementing the equalisation algorithm. At a high feed rate the recovery is much quicker as shown in FIG. 9(b).

2. Intelligent Shunt Performance

The shunt interface unit 7 is designed to support the shunt in providing a wide range of string current measurement. The intention is to extend the range of normal current measurement presented by the shunt to cover the low current requirements needed by the float region. The shunt interface unit 7 acquires the shunt differential voltage and differential temperature. The string node controller utilises these values for calculating the string current. The electronic interface accounts for the necessary signal amplification in catering for the full current operational range.

Due to the wide range of current commonly encountered in standby applications, accurately measuring the float current of a battery string is a difficult task. A typical battery string may have charge and discharge currents of hundreds of amperes while the float current may be measured in tens to hundreds of milliamperes. The measuring device must be able to pass the full load or charge current with minimal voltage drop. A typical 500 A-50 mV current shunt has a resistance of 100 micro-ohms. 10 mA of float current will produce 1 microvolt. While this may be amplified to a measurable level with a carefully designed high gain amplifier, thermal effects can notably influence measurement accuracy. The use of chopper stabilised operational amplifiers can significantly reduce amplifier drift and offset errors to acceptable levels however careful analysis of the actual measured signal must also be made.

As a shunt's measuring-element (such as manganin) is normally connected to copper sense wires (or copper printed circuit board tracks), a thermocouple is formed where the dissimilar metals meet. The temperature coefficient for a manganin/copper thermocouple is approximately 1.5 microvolts per degree Celsius. The signal-amplifier inputs sees the sum of the voltage developed across the shunt plus the two thermocouple voltages, i.e. $V_{Cu/(Cu-Mn)} + I_{Load} \times R_{Shunt} + V_{(Cu-Mn)/Cu}$. If both ends of the shunt are at the same temperature, the thermocouple voltages will cancel. However, less than one-degree centigrade difference in temperature between the measuring terminals of the shunt will cause an offset in the measured voltage (current).

According to some embodiments of the present invention, through measuring the temperature of the shunt connection points, compensation may be made for the thermocouple effects at the connection junctions. FIG. 10 shows the temperature of the shunt's two-sense connections. According to some embodiments of the invention, the difference between the two temperatures is used to compensate the float current measurement. The test presented in FIG. 10 corresponds to no current flowing through the shunt.

FIGS. 1 to 5 describe an organisation for battery management. The organisation is based on a generic battery node. The node facilitates hardware for sensing, feeding and draining the cells of a battery. The storage resources provide room for algorithms that handle both monitoring and control. Charge control is managed through energy sharing among the group. The approach utilises the sense line for low cell feeding or draining. This encourages battery embedded electronics. The cell charge feeding and draining approach could facilitate battery remote testing, thus allowing for investigation of both battery charge and health without sacrificing the system integrity.

Figure 11:
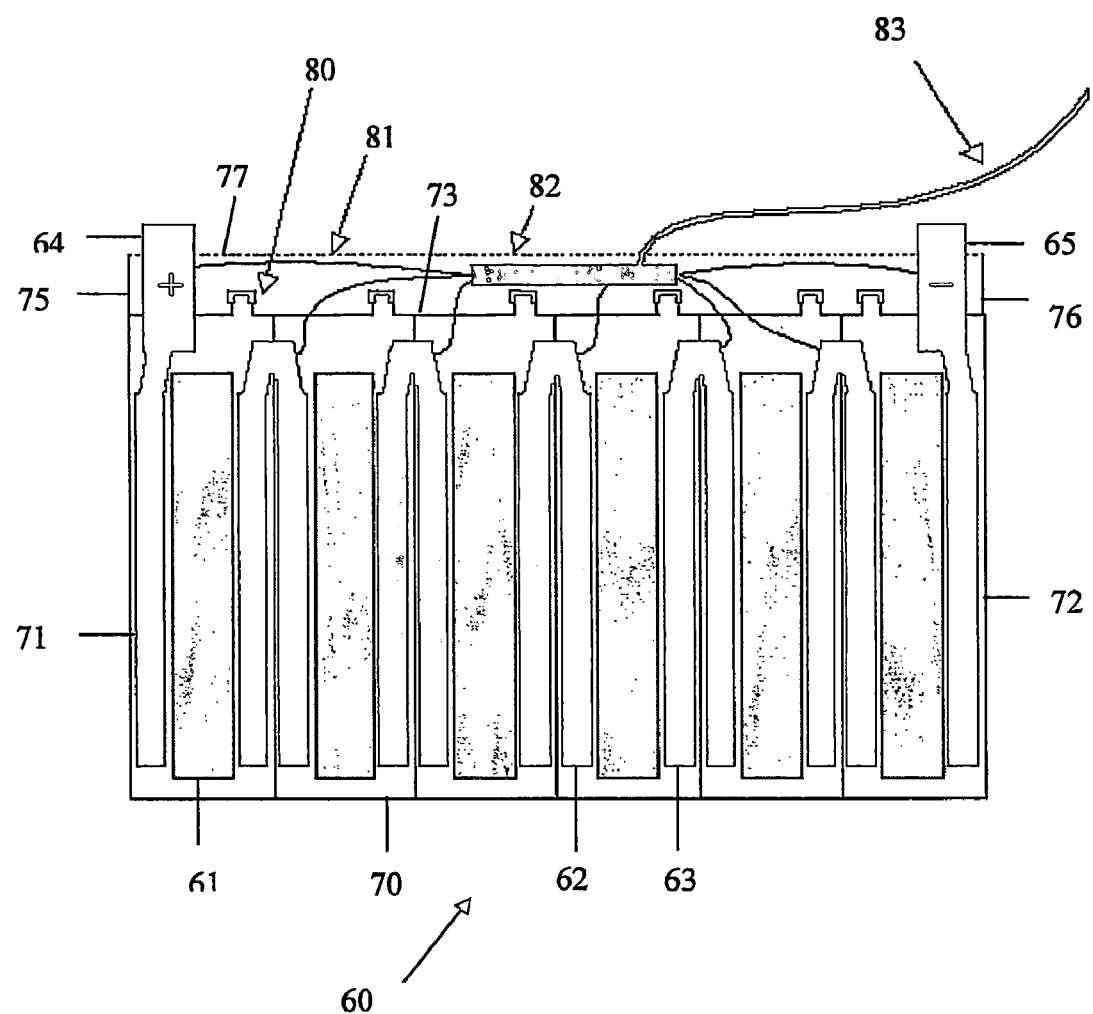
FIG. 11 is a cross-section through a group of cells with an embedded battery management apparatus according to further embodiments of the invention.

An embedded electronics solution according to further embodiments of the invention is shown in FIG. 11. A 12V mono-bloc 60 has six cells. The six cells are enclosed in a cell compartment bounded by a base 70, side walls 71,72, upper wall 73, and a pair of front/rear walls (not shown). The cell compartment is further sub-divided into six cell sub-compartments, each containing a battery chemical compartment 61 containing electrolyte, and a pair of electrodes 62,63. A valve 80 is provided in the upper wall for each compartment. The electrodes are connected in series and external ports 64,65 provide connection to the cells.

An electronics compartment is bounded by side walls 75,76, wall 73, wall 77 and a pair of front/rear walls (not shown). An electronics package 82 (containing MEIU 4, node controller 5 and communications controller 6) is housed in the electronics compartment and has output feed/sense lines 81 connected to the six electrodes 71, and a communications and external supply line 83.

Exemplary Circuit Implementations

Figure 12:
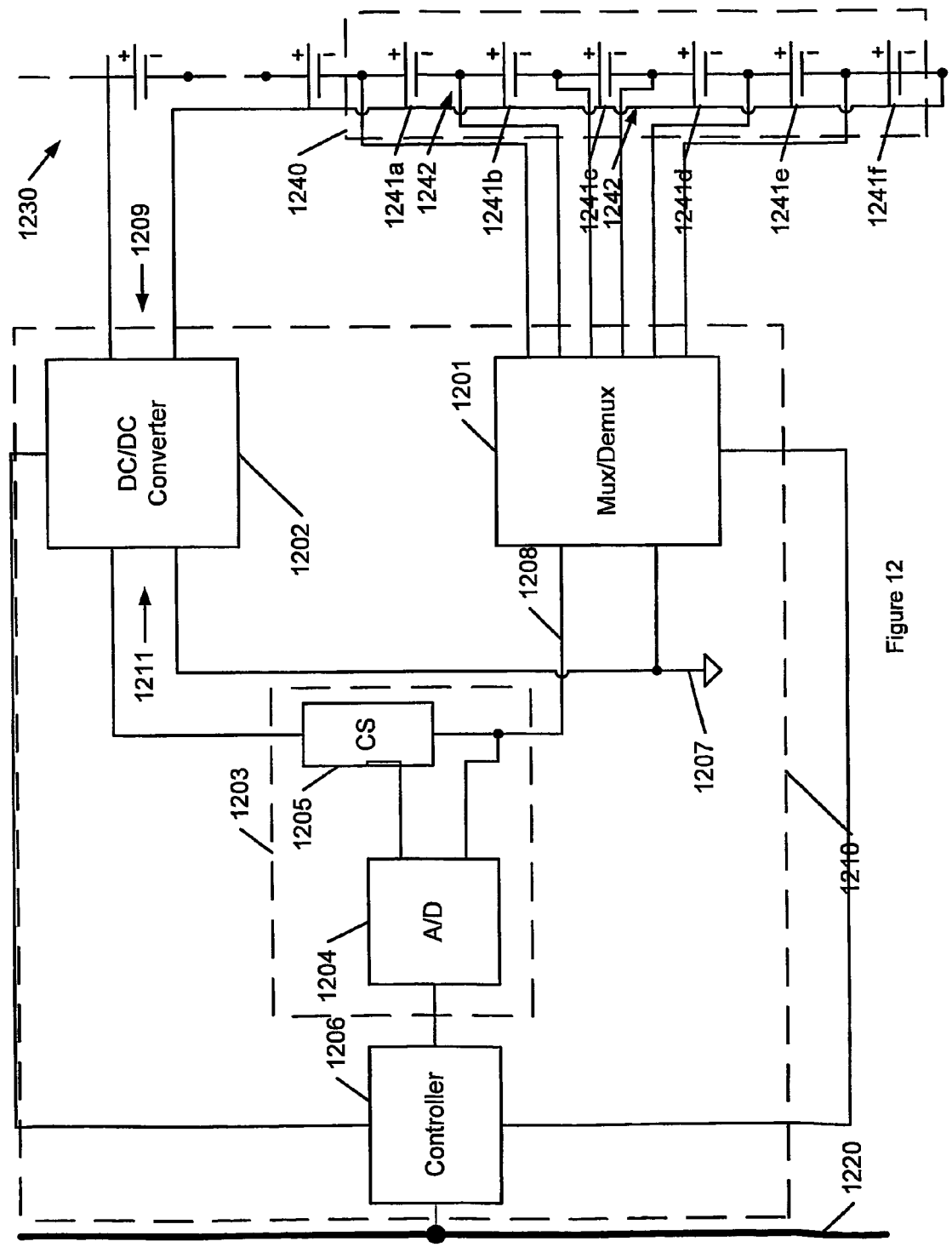
FIG. 12 is a schematic diagram of a battery management apparatus according to some embodiments of the invention.

FIG. 12 illustrates battery management apparatus 1210 for managing a substring 1240 of a string 1230 of cells according to further embodiments of the invention, i.e., circuitry that may provide intelligent node operations described above and that may be integrated with a battery as described above. The apparatus 1210 includes a multiplexer/demultiplexer (mux/demux) circuit 1201 that is operative to selectively couple nodes 1242 of cells 1241*a*, 1241*b*, 1241*c*, 1241*d*, 1241*e*, 1241*f* of the substring 1240 to a DC bus 1208 and a ground bus 1207. The mux/demux circuit 1201 is controlled by a controller circuit 1206, which is configured to be connected to a communications bus 1220, and operative to send and receive messages over the communications bus 1220.

The apparatus 1210 further includes a DC/DC converter circuit 1202 that has a first port 1209 coupled to the string 1230, for example, across a plurality of cells of the string 1230. The DC/DC converter circuit 1202 further includes a second port 1211 that is coupled to the DC bus 1208 and the ground bus 1207. The DC/DC converter circuit 1202 is operative to transfer energy between the first and second ports 1209, 1211 such that energy can flow to and from cells of the substring 1240 from the other cells of the string 1230. Preferably, the DC/DC converter circuit 1202 provides isolation between the first and second ports 1209, 1211, such that the local ground bus 1207 may float with respect to a ground of the string 1230. This can be particularly advantageous, as it may allow the apparatus 1210 to be installed at various locations in the string 1230.

The apparatus 1210 further includes a sensor circuit 1203 that is coupled to the DC bus 1208 and/or the ground bus 1207. As shown, the sensor circuit 1203 includes an analog to digital (A/D) converter circuit 1204 that receives a current sense signal from a current sensor 1205, such as a current sense resistor or current transformer, that senses a current in the DC bus 1208. The A/D converter circuit 1204 also receives a voltage signal from the DC bus 1208. The A/D circuit 1204 is operative to responsively provide digital current and/or voltage values to the controller circuit 1206.

It will be appreciated that the apparatus 1210 can be used for monitoring, testing and energy redistribution (e.g. equalization) purposes along the lines described above. For example, the mux/demux circuit 1201, sensor circuit 1203 and controller circuit 1206 may monitor cell voltage and/or current and report the monitored values to a higher-level controller via the communications bus 1220. In certain testing modes, the controller circuit 1206 may also control the mux/demux circuit 1201 and the DC/DC converter circuit 1202 such that one or more of the cells 1241*a*-1241*f* are loaded (discharged) while monitored by the sensor circuit 1203. In general, the apparatus 1210 may be used to conduct test or monitoring functions that involve measuring cell parameters, such as voltage and current, during a discharge period, such as discharge tests described in the various battery capacity and reserve life estimation techniques described in U.S. Pat. No. 6,469,471, Published PCT International Application No. WO 00/7568 A1, and the United States Patent Application entitled "Apparatus, Methods and Computer Program Products for Estimation of Battery Reserve Life Using Adaptively Modified State of Heath Indicator Based Reserve Life Models, by Anbuky et al., filed Jul. 1, 2003. In certain energy redistribution modes, the controller circuit 1206 may control the mux/demux circuit 1201 and the DC/DC converter circuit 1202 such that energy is transferred to or from one or more of the cells 1241*a*-1241*f* via the DC/DC converter circuit 1202.

Such testing and/or energy redistribution operations may be initiated responsive to messages transmitted to the apparatus via the communications bus 1220, and test data or other status information relating to the substring 1240 may be transmitted on the communications bus 1220 by the apparatus 1210. It will be further appreciated that a plurality of such management apparatus 1210 may be coupled to respective substrings of a battery string, and may communicate over a common communications bus, such as the communications bus 1220, along lines discussed above with reference to FIG. 1. The apparatus 1210 also lends itself to integration within a battery unit, e.g., a monobloc comprising six 2-volt cells.

Figure 13:
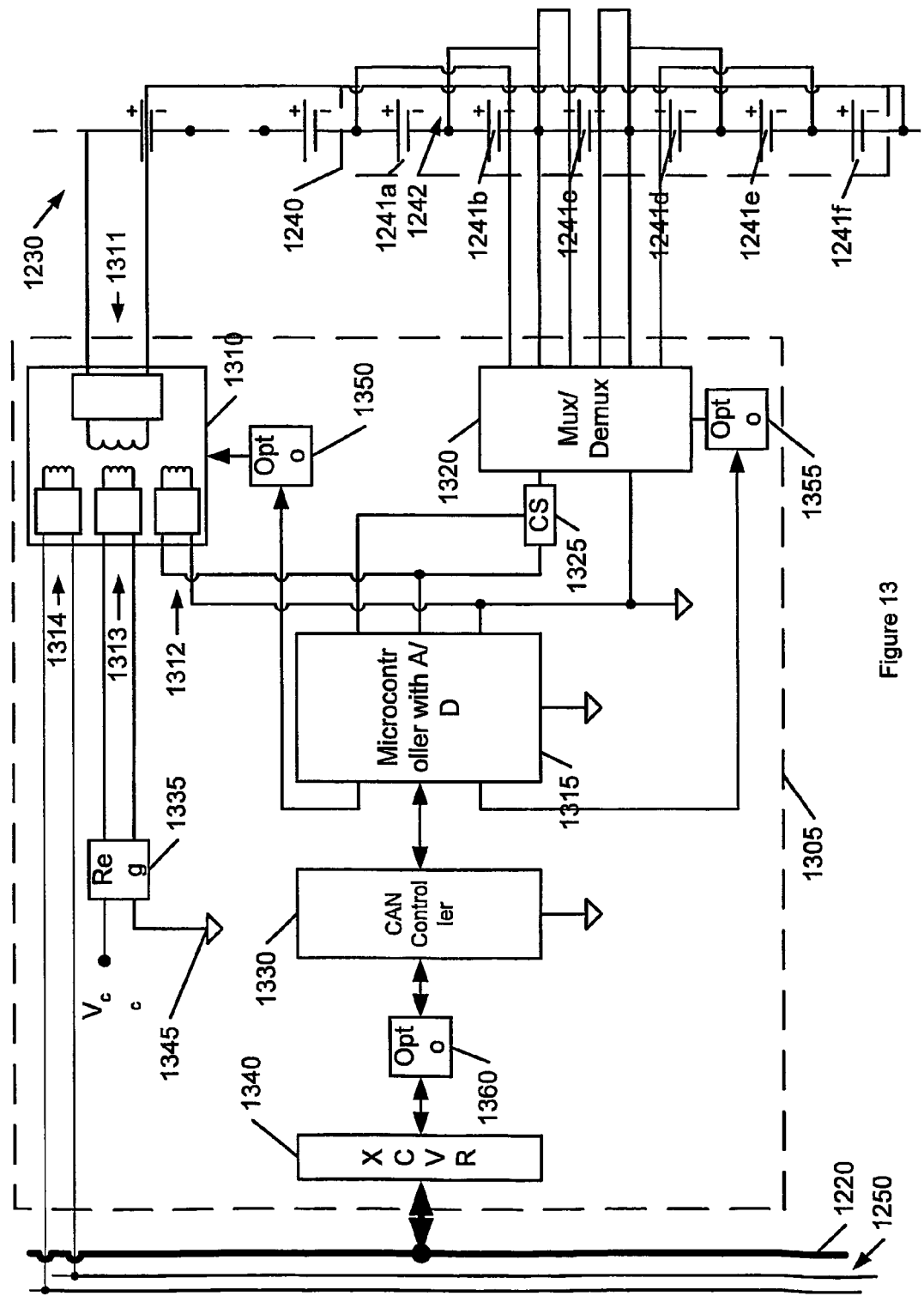
FIG. 13 is a schematic diagram of a battery management apparatus according to further embodiments of the invention.

FIG. 13 illustrates a battery management apparatus 1305 according to further embodiments of the invention. The apparatus 1305 comprises a mux/demux circuit 1320 that is operative to selectively couple nodes 1242 of cells 1241*a*, 1241*b*, 1241*c*, 1241*d*, 1241*e*, 1241*f* of the substring 1240 to a DC bus 1308 and a ground bus 1307. The mux/demux circuit 1320 is controlled by a microcontroller 1315, which includes an integral A/D converter that receives the voltage between the DC bus 1308 and the ground bus 1307 and a voltage generated by a current sensor 1325 (e.g., a current transformer or sense resistor) operatively associated with the DC bus 1308. The apparatus 1305 further includes a Controller Area Network (CAN) controller circuit 1330 that is operative to provide CAN communications for the microcontroller 1315 over a CAN bus 1220 via a transceiver 1340 and optoisolator 1360. CAN is a well-known communications protocol commonly used in industrial automation, and is described at www.can-cia.org.

The apparatus 1305 also includes a multiport DC/DC converter circuit 1310 that includes a first port 1311 configured to be coupled to the string 1230, a second port 1312 coupled to the DC bus 1308 and the ground bus 1307, a third port 1313 coupled to an input of a voltage regulator circuit 1335 that provides power to circuits of the apparatus 1305, and a fourth port 1314 that is configured to be coupled to a power bus 1250 associated with the CAN communications bus 1220. The DC/DC converter circuit 1310 is controlled by the microcontroller 1315 via an optoisolator 1350. Under control of the microcontroller 1315, the DC/DC converter circuit 1310 is operative to transfer energy via the ports 1311, 1312, 1313, 1314.

In certain modes of operation, such as test or energy redistribution (e.g., equalization) modes, the DC/DC converter circuit 1310 may be used to transfer energy between the first and second ports 1311, 1312. For example, along lines discussed above, the apparatus 1305 may be used to conduct test or monitoring functions that involve measuring battery parameters, such as voltage and current, during a discharge period, such as discharge tests described in the various battery capacity and reserve life estimation techniques discussed above. In particular, the DC/DC converter circuit 1310 may be used to load one or more of the cells 1241*a*-1241*f*, by transferring energy from the second port 1312 to the first port 1311, while the microcontroller 1315 senses cell parameters, such as current and/or voltage. Similar energy transfer (in either direction) may occur in energy redistribution (e.g., equalization) operations. Such monitoring, testing and energy redistribution operations may be initiated and/or controlled responsive to messages received over the communications bus 1220, and/or test data or status information from such operations may be transmitted from the apparatus 1305 over the communications bus 1220. The apparatus 1305 lends itself to integration within a battery unit, e.g., a monobloc comprising six 2-volt cells.

The third and fourth ports 1313, 1314 may be used to provide redundant power for the components of the apparatus 1305. For example, under conditions where the string 1230 is sufficiently charged to provide power, the DC/DC converter circuit 1310 may transfer energy from the string 1230 to the regulator circuit 1335 coupled to the third port 1313 to provide power to, for example, the microcontroller 1315, the CAN controller circuit 1330 and the transceiver circuit 1340 (it will be appreciated that the regulator 1335 may generate one or more working voltages). However, if the string voltage is insufficient, the DC/DC converter circuit 1310 may instead transfer energy between the fourth port 1314 and the third port 1313 such that these components may be powered from the power bus 1250 associated with the CAN communications bus 1220.

Figure 14:
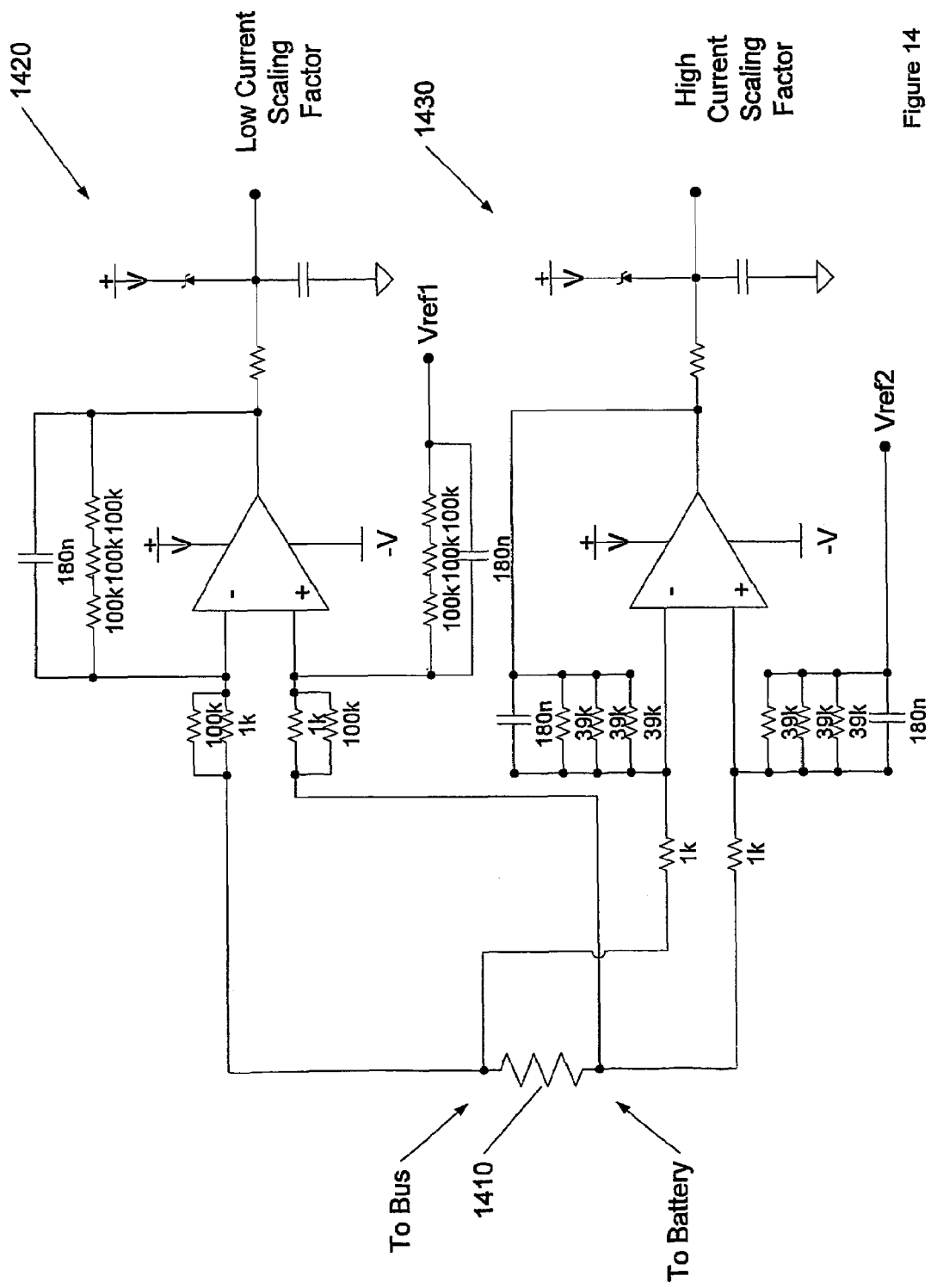
FIG. 14 is a schematic diagram of a shunt amplifier circuit according to further embodiments of the invention.

FIG. 14 illustrates an exemplary shunt amplifier circuit 1400 that may be used with a shunt interface unit as discussed above. The circuit 1400 includes respective high and low gain amplifier circuits 1420, 1430 that are configured to amplifier a voltage across a shunt 1410. The high gain circuit 1420 provides a gain of approximately 330, which is appropriate for use when the current through the shunt 1410 is relatively low. The low gain circuit 1430 provides a gain of approximately 13, which is appropriate for use when the current in the shunt is relatively high. It will be appreciated that the outputs of the circuits 1420, 1430 may be provided to an A/D and controller (e.g., the integrated microcontroller 1315 of FIG. 13), which may select therefrom based on, for example, the current level. The inventors have found that the illustrated configuration is effective for a 55 mV/500 A shunt for currents in a range from about 10 mA to about 500 A.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept. It is therefore intended by the appended claims to cover any and all such applications, modifications and embodiments within the scope of the present invention.

That which is claimed:

1. A battery management system for managing a string of cells including a sensing module; a DC/DC converter; a control module coupled to the sensing module and the DC/DC converter; and a common line coupled to both the sensing module and the DC/DC converter and adapted for connection to a battery when in use, wherein the sensing module is configured to receive battery information from the common line and output a sensing signal to the control module in accordance with the battery information, wherein the control module is configured to receive the sensing signal from the sensing module and output a control signal in accordance with the battery information, and wherein the DC/DC converter has a first port configured to be coupled across a plurality of cells of the string and a second port coupled to the common line, the DC/DC converter operative to transfer energy between the first and second ports to feed and/or drain a battery connected to the common line when in use in accordance with the control signal.

2. A system according to claim 1 including a multiplexer for selectively connecting a plurality of batteries to the common line.

3. A battery management system for managing a string of cells including a sensing module; a DC/DC converter; and a control module coupled to the sensing module and the DC/DC converter; wherein the sensing module is configured to receive battery information from a common line and output a sensing signal to the control module in accordance with the battery information, wherein the control module is configured to receive the sensing signal from the sensing module and output a control signal in accordance with the battery information, wherein the DC/DC converter has a first port configured to be coupled across a plurality of cells of the string and a second port coupled to the common line, the DC/DC converter operative to transfer energy between the first and second ports to feed and/or drain a battery connected to the DC/DC converter when in use in accordance with the control signal in order to perform equalization of the string of serially connected batteries, and wherein the control module is configured to perform one or more additional battery monitoring or management tasks.

4. A system according to claim 3 wherein the one or more additional battery monitoring or management tasks include impedance testing.

5. A system according to claim 3 wherein the one or more additional battery monitoring or management tasks include capacity testing.

6. A system according to claim 1 wherein the sensing module, DC/DC converter and control modules are enclosed in a battery compartment.

7. A system according to claim 1 including a multiplexer for selectively connecting a plurality of batteries to the sensing module and/or the DC/DC module.

8. A battery management apparatus for managing a substring of cells in a string of cells, the apparatus comprising:
a DC bus;
a multiplexer/demultiplexer circuit operative to selectively couple nodes of the substring of cells to the DC bus;
a DC/DC converter circuit having a first port configured to be coupled across a plurality of cells of the string and a second port coupled to the DC bus, the DC/DC converter operative to transfer energy between the first and second ports;
a sensor circuit coupled to the DC bus; and
a controller circuit configured to connect to a communications bus and operatively associated with the multiplexer/demultiplexer circuit, the DC/DC converter and the sensor circuit.

9. An apparatus according to claim 8, further comprising a ground bus, wherein the multiplexer/demultiplexer circuit is operative to selectively connect the nodes to the DC bus and the ground bus, and wherein the second port of the DC/DC converter circuit is coupled to the DC bus and the ground bus.

10. An apparatus according to claim 9, wherein the first and second ports of the DC/DC converter circuit are isolated from one another.

11. An apparatus according to claim 9, wherein the DC/DC converter circuit further comprises a third port and is operative to transfer energy between the first and third ports, and wherein at least one of the controller circuit, the multiplexer/demultiplexer circuit and the sensor circuit are configured to be powered from the third port.

12. An apparatus according to claim 11, wherein the DC/DC converter circuit further comprises a fourth port configured to be coupled to a power supply bus associated with the communications bus and is operative to transfer energy between the fourth port and the third port to power to at least one of the controller circuit, the multiplexer/demultiplexer circuit and the sensor circuit.

13. An apparatus according to claim 9, wherein the controller circuit is operative to cause the multiplexer/demultiplexer circuit to couple the DC bus and the ground bus to respective selected first and second nodes of the substring of cells, to cause the sensor circuit to sense a voltage between the DC bus and the ground bus and to cause the DC/DC converter circuit to transfer energy between the selected first and second nodes and the plurality of cells of the strings responsive to the sensed voltage.

14. An apparatus according to claim 9, wherein the controller circuit is operative to adjust the cells of the string by causing the multiplexer/demultiplexer circuit and the DC/DC converter circuit to transfer energy between at least one cell of the substring and the plurality of cells.

15. An apparatus according to claim 9, wherein the controller circuit is operative to cause the multiplexer/demultiplexer circuit to couple the DC bus and the ground bus to respective selected first and second nodes of the substring of cells, to cause the DC/DC converter circuit to transfer energy between the selected first and second nodes and the plurality of cells of the strings responsive to the sensed voltage, to cause the sensor circuit to sense a voltage between the DC bus and the ground bus and/or a current at the DC bus responsive to the transfer of energy.

16. An apparatus according to claim 15, wherein the controller circuit is further operative to determine a status of at least one cell of the substring responsive to the sensed voltage and/or current.

17. An apparatus according to claim 15, wherein the controller circuit is operative to transmit battery information over the communications bus responsive to the sensed voltage.

18. An apparatus according to claim 9, wherein the controller circuit is operative to cause the multiplexer/demultiplexer circuit and the DC/DC converter circuit to load at least one cell of the substring while causing the sensor circuit to generate test data for the loaded at least one cell.

19. An apparatus according to claim 18, wherein controller circuit is further operative to process the generated test data to determine a status of the at least one cell.

20. An apparatus according to claim 19, wherein the controller circuit is operative to generate at least one of an estimate of capacity and an estimate of reserve life from the generated test data.

21. An apparatus according to claim 20, wherein the controller circuit is operative to transmit the at least one of an estimate of capacity and an estimate of reserve life over the communications bus.

22. An apparatus according to claim 18, wherein the controller circuit is further operative to transmit cell information on the communications bus responsive to the generated test data.

23. An apparatus according to claim 8, wherein the sensor circuit comprises an analog to digital (A/D) converter circuit operative to generate a digital value representative of a voltage at the DC bus and wherein the controller circuit is operative to receive the digital value.

24. An apparatus according to claim 8:
wherein the sensor circuit comprises:
a current sensor operative to generate a voltage responsive to a current in the DC bus; and
an A/D converter circuit coupled to the current sensor and operative to generate a digital value representative of the voltage generated by the current sensor; and
wherein the controller circuit is operative to receive the digital value.

25. A plurality of battery management apparatus according to claim 8, respective ones of which are connected to respective substrings of the string of serially-connected cells, wherein the controller circuits of the plurality of battery management apparatus are coupled to the same communications bus.

26. A system according to claim 3 wherein the sensing module, DC/DC converter and control modules are enclosed in a battery compartment.

27. A system according to claim 3 including a multiplexer for selectively connecting a plurality of batteries to the sensing module and/or the DC/DC converter.

* * * * *